June 13, 1933.　　F. KIEFERT ET AL　　1,913,930
SCREW THREADING MACHINE
Filed Dec. 18, 1930　　4 Sheets-Sheet 1

Inventors
Paul Kiefert
Paul Peter
By Eugene C. Strens
Their Attorney

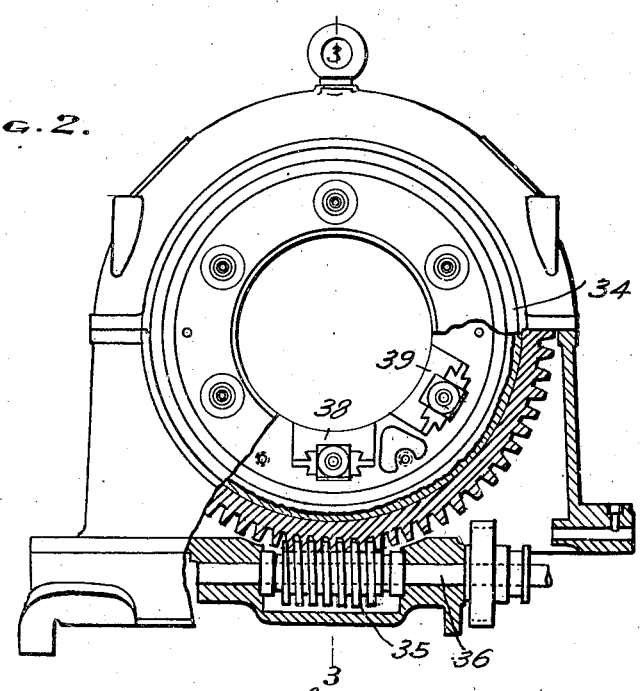
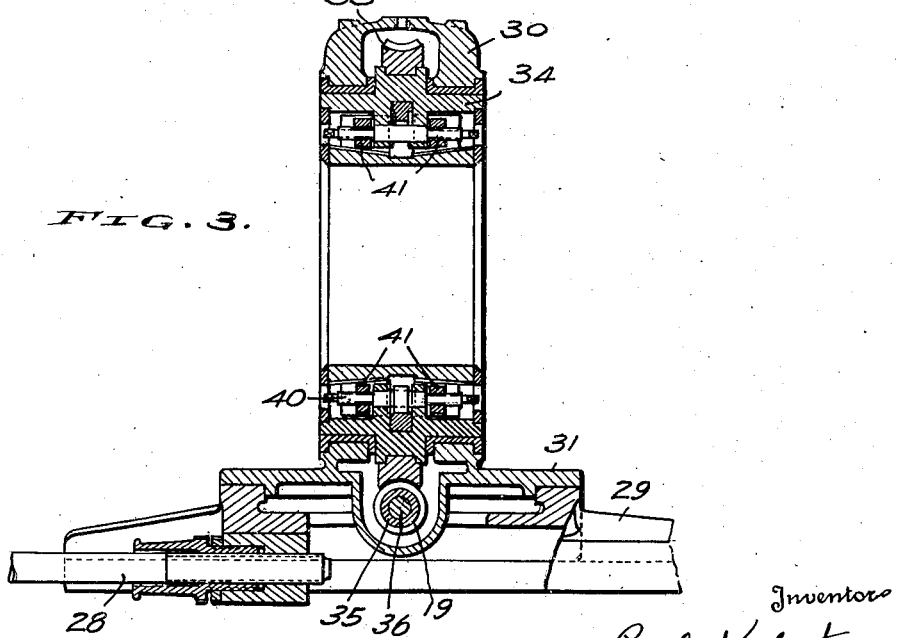

June 13, 1933.  P. KIEFERT ET AL  1,913,930
SCREW THREADING MACHINE
Filed Dec. 18, 1930  4 Sheets-Sheet 3
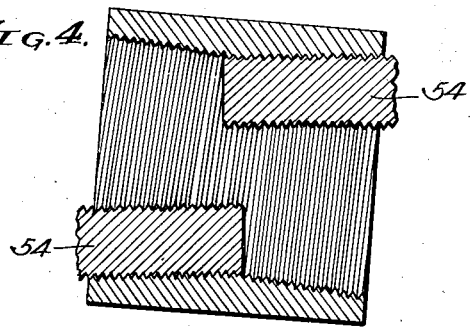
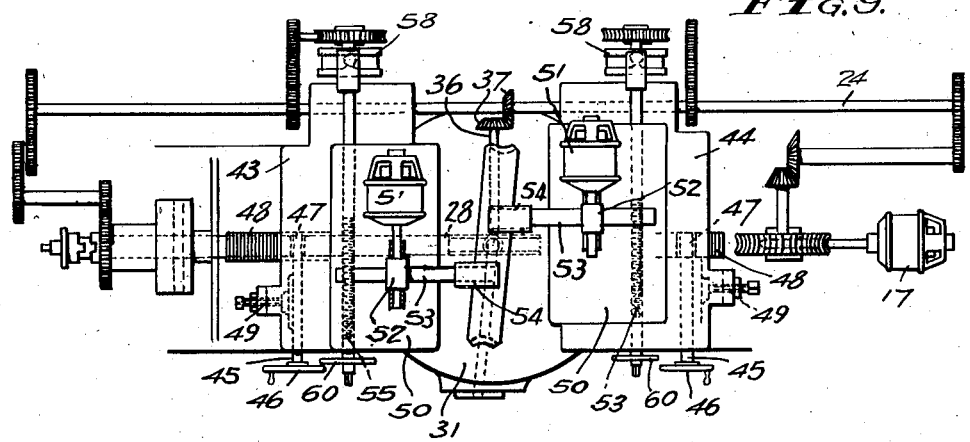
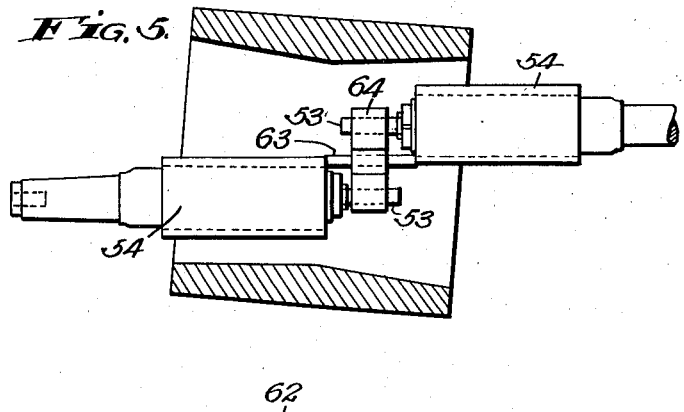
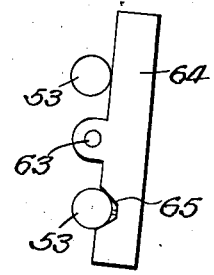
Inventors
Paul Kiefert
Paul Peter
By Eugene Stevens
Their Attorney

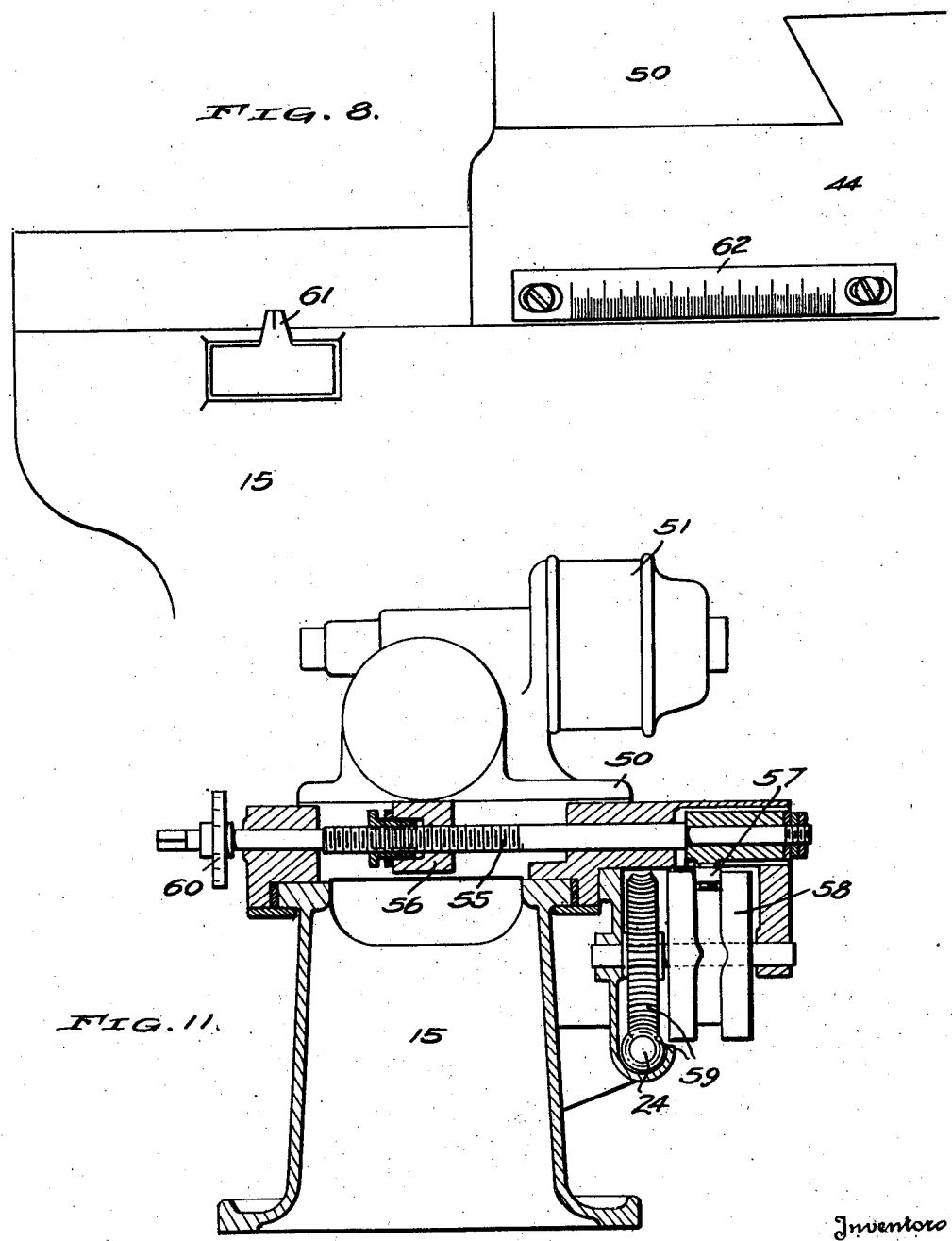

Patented June 13, 1933

1,913,930

UNITED STATES PATENT OFFICE

PAUL KIEFERT, OF BERLIN-SPANDAU, AND PAUL PETER, OF BERLIN, GERMANY

SCREW THREADING MACHINE

Application filed December 18, 1930, Serial No. 503,310, and in Germany January 22, 1929.

The present invention relates to screw threading machines, and has for an object to provide a machine for producing screw threads in two internal and external oppositely disposed conical surfaces of the work, and to produce identical threads in both conical surfaces so that the combined thread produced will pass over the apex of the surfaces and thus provide an accurate and continuous thread over the entire length of both surfaces.

Heretofore, for producing the above result a plain threading tool has been used on a lathe with a lead screw and a great deal of time is lost with this machine and method. Either the work had to be set twice to accomplish the result, or both conical surfaces had to be milled or cut one after the other, and furthermore it was never possible to obtain a thread running accurately and continuously over both of the conical surfaces.

Other devices attempting to accomplish this object embodied the advancing of the milling or cutting tool by a long arbor over the apex of the two conical surfaces after the thread had been cut or milled in one of the conical surfaces, the work being set only once and the head stock for setting the work being disposed at an angle, and then cutting or milling the continuation of the thread by advancing the tool over the oppositely disposed conical surface. With this latter method and apparatus it is not possible to accurately carry over the cuts on the apex lines of the cones or to obtain an accurate or continuous thread along both conical surfaces because the tool holder requires that it be traversed during the operation.

Various other methods and apparatus have been employed in an attempt to produce the result of this invention, but the same not only lack accuracy in the continuity of the thread between the conical surfaces, but also require a number of time consuming steps and adjustments, as well as a number of different tools and devices for carrying out the purpose.

Another object of the present invention is to overcome all the prior obstacles encountered in the various tools and machines heretofore employed by providing milling cutters for cutting or milling the thread in one setting of the work which operate simultaneously from opposite sides of the work in one revolution by use of plain milling cutters with annularly disposed teeth, and wherein the axial feed which is required when using tools of this class is carried out for a length corresponding to one pitch of the work piece simultaneously for both tools. This axial feed for obtaining the thread pitch is effected for the work head stock simultaneously for both tools by operation of a single screw, so that accurate and identically corresponding threads having exactly the same pitch is produced at both sides of the conical surface.

A further object of the present invention is to provide a machine for simultaneously cutting identical threads in opposed conical surfaces and to produce the work with a higher degree of out-put than has heretofore been obtained with any known or used machine or tools.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of a thread cutting machine constructed according to the present invention.

Figure 2 is a detail enlarged side elevation, partly in section, of the work holder.

Figure 3 is a vertical section taken through the same substantially on the line 3—3 of Figure 2.

Figure 4 is a detail sectional view taken through a piece of work showing the milling cutters of this invention applied thereto, the view being diagrammatic to show the relation between the cutters.

Figure 5 is a similar view but with the cutters arranged for relative adjustment, and showing the application of a gauge constructed according to the present invention.

Figure 6 is a side elevation, enlarged, of the gauge detached.

Figure 7 is a plan view of a thread gauge for attachment to the machine.

Figure 8 is an enlarged front elevation of one end of the machine, showing the gauge of Figure 7 applied thereto and in its relation to the machine frame.

Figure 9 is a top plan view of the machine with the casings and other parts removed for showing the drive connections and relatively adjustable parts.

Figure 11 is a vertical transverse section taken through the intermediate portion of the machine on an enlarged scale.

Figure 10:
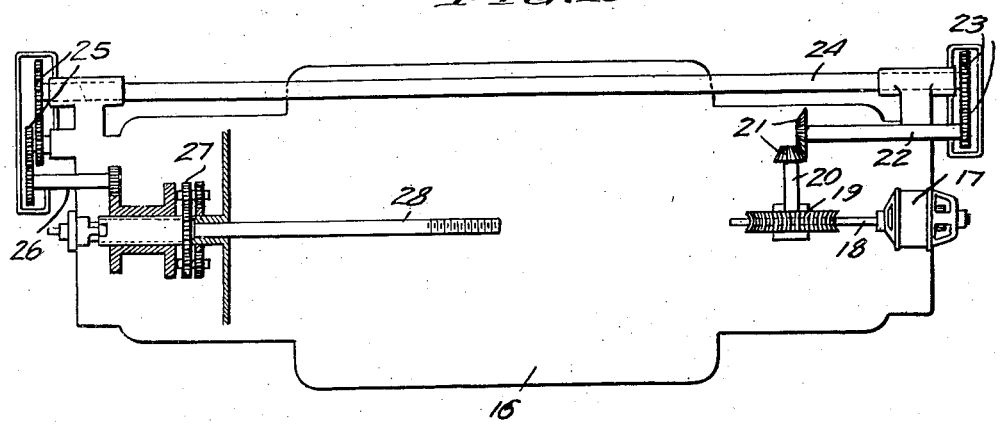
Figure 10 is a detail top plan view of the bed plate and the parts carried thereby.

Referring now to the drawings, 15 designates the pedestal frame of the machine upon which is supported the horizontal bed plate 16 which, as shown in Figure 10 particularly, supports at one end a main motor 17 provided with a shaft 18 connected by work gearing 19 located adjacent the motor near one end of the bed plate 16, with a transversely extending shaft 20 connected by bevel gears 21 to a rear shaft 22 which preferably is disposed in parallel relation to the shaft 18 and its motor and projects beyond the adjacent end of the bed plate and is connected by spur gears 23 to a rear longitudinal shaft 24 extending across the rear portion of the bed plate to the opposite end thereof. The opposite end of the shaft 24 is connected by a train of gears 25 and a shaft 26 to a planetary gear transmission 27 for operating a feed screw or shaft 28, which is disposed along the longitudinal central axis of the machine immediately above the bed plate and is adapted to automatically feed the work.

Slidably mounted on the bed plate 16, at the intermediate portion thereof is a saddle 29, which is best shown in Figures 2 and 3, and within one edge of which is screw threaded the shaft 28, so that by turning of the shaft the saddle 29 is shifted lengthwise of the bed plate. The head stock 30 is mounted on the saddle 29 and is provided with a circular disc 31 at its lower end which is seated for rotation on the upper end of the saddle 29 and adjusted thereon to desired axially rotated positions according to a scale 32, shown in Figure 1. The head stock is clamped by means of bolts or screws 33 after the adjustment is obtained, the bolts 33 engaging through the disc base or foot piece of the head stock.

The head stock comprises a substantially drum shaft frame which rises from the disc 31 and has its vertical axis coincident with that of the disc 31. The frame of the head stock carries a rotatable drum 34 provided with a worm wheel 35 at its central peripheral portion meshing beneath the drum with a worm 35$^a$ mounted on a shaft 36 which extends rearwardly from the saddle 29 and, as shown in Figure 9, is connected by bevel gears 37 with the rear driving shaft 24. As clearly shown in Figure 9, the shaft 36 is provided with a universal section or coupling admitting of the axial adjustment of the head stock without interfering with the driving of the drum 34 from the drive shaft 24 of the machine.

The drum 34 carries a plurality, preferably three, centering jaws 38 and intermediate securing or clamping jaws 39 for centering the work within the head stock and for subsequently clamping the work rigidly within the drum 34, so that the work will turn therewith. These centering and securing jaws 38 and 39 are adjusted by transversely disposed screws 40 terminating at opposite ends at the sides of the head stock to facilitate the application of a key or other suitable tool for turning the screws 40 to radially move the jaws 38 and 39. Each screw 40 carries oppositely directed threads at opposite ends and has bearing at its intermediate portion in the adjacent part of the drum 34. Traveling wedges 41 are mounted on opposite ends of the screw 40 and are adapted to simultaneously and equally move toward and from each other and over inclined faces on the inner sides of the respective jaws 38 and 39, so as to operate the same with a wedging action.

Slidably mounted at opposite sides of the head stock 30 and on the bed plate 16 is a pair of travelers or carriages 43 and 44. Each carriage carries a shaft 45 having an end wheel 46 thereon with the hand wheel arranged at the front of the machine and the shaft 45 extending rearwardly and provided at its rear end with a pinion 47 meshing with a rack 48 fixed upon the bed plate 16. Rotation of the hand wheel 46 shifts the carriage lengthwise on the bed plate, and an adjustable stop or locking device 49 is mounted on the adjacent carriage to engage the shaft 45 and secure it from turning when the carriage is adjusted.

Each carriage is provided with a sliding plate 50 which is movable back and forth with respect to the bed plate 16 and transversely with respect to the direction of adjustment of the carriage. Each plate 50 carries a motor 51, which is connected by worm gearing 52 or the like to a shaft 53 carrying on its outer end a milling cutter 54. The shafts 53 extend inwardly toward the central portion of the lathe from their respective plates 50, and as shown clearly in Figure 9, the shafts 53 with their milling cutters 54 are offset in slightly overlapping relation when in their normal working positions. The milling cutters 54 are moved toward and from each other by the relative movements of the plates 50 while they are moved toward and from each other relatively to their overlapping positions by the movements of the carriages 43 and 44.

The plates 50 are automatically moved by threaded transverse shafts 55 in predetermined threaded engagement with projections 56 from the plates 50 and by means of a roller projection 57 at the rear end of the shaft 55 which projects into engagement with a cam wheel 58, the latter being connected by worm gearing 59 to the longitudinal drive shaft 24.

The forward ends of the shaft 55 may be provided with index wheels 60 for regulating the depth of the thread being cut.

Figure 1:
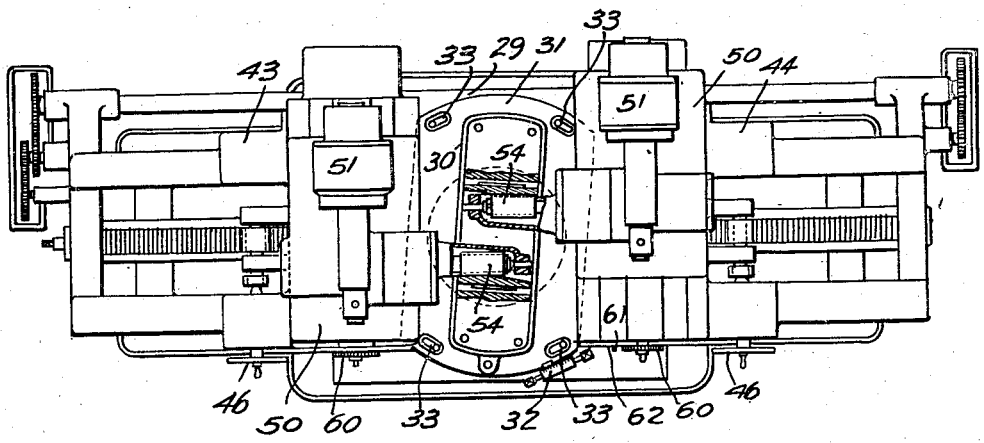

The front of the machine frame 15 is provided with an index projection 61 for cooperation with a gauge 62 which is secured upon the front face of one of the carriages, such as 44, shown to advantage in Figures 1 and 8. The gauge 62 carries gauge marks corresponding to thread pitch and by means of which the carriage 44 may be initially adjusted as will hereinafter appear.

In Figures 5 and 6 there is shown a gauge adapted to be used as a part of this machine for determining the longitudinal positions of the milling cutters 54, which positions must be calculated from the pitch of the thread, the cone angle of the faces to be cut and the diameter of the thread to be produced. The gauge comprises a bar 63 secured through a positioning plate 64, the bar passing through the central portion and in an edgewise direction through the plate. In one side of the plate 64 and toward one end thereof is provided a transverse groove or recess 65 preferably V-shape in cross section and adapted to fit against one side of the shaft 53, as shown in Figures 5 and 6, to insure that the plate 64 is disposed in true right angular relation with respect to the axis of the milling cutter 54. The other end of the plate 64 is provided with a flat uninterrupted surface adapted to bear against the projecting end of the opposite shaft 53 of the opposite milling cutter 54.

The milling cutters 54 are moved toward each other into such position that the bar 63 may engage at opposite ends against the outer extremities of the cutters 54 to properly space the same apart according to the length of the bar 63 when the milling cutters engage the opposite ends of the bar.

It will be noted from Figure 4 that the milling cutters 54 are provided with annular cutting teeth without any pitch and that they are arranged in parallel relation to each other, the work being adjusted to the proper angle or inclination of the conical surfaces to be cut.

By use of this machine it is possible to simultaneously cut two conical screw threads with the same pitch on a single piece of work in one setting. In order to insure that the threads accurately coincide at the meeting point of the two conical surfaces, a corresponding longitudinal position of the two tools or cutters 54 relative to one another is necessary, this position being independent of the pitch of the thread, the cone angle and the diameter of the thread to be produced. This longitudinal positioning of the milling cutters 54 relative to one another is obtained in the manner above described by use of the gauge bar 63, shown in Figures 5 and 6. One of the tools 54 is preferably adjusted before hand in a longitudinal direction by means of the hand wheel 46 and its parts and subsequently the second tool 54 is moved longitudinally toward the first tool to an extent wherein its cutting edge likewise projects beyond the cone apex of the surfaces to be cut, the length to which it is to be moved after being fixed by the gauge being exactly any desired multiple of the thread pitch. For accomplishing this last adjustment the graduated scale 62 is used which is brought into proper relation to the index point 61 on the frame 15 of the machine as the carriage 44 is moved inwardly. The pitchless milling cutters 54 which have the annularly disposed milling teeth for producing the thread, are accurately ground to half the tooth space so that the length of the gauge to be used may be easily calculated. After the two tools have been adjusted in the manner above described, the scale 62, which is arranged slidable on the carriage 44 is so adjusted that one division line coincides exactly with the fixed point 61 on the frame or bed of the lathe. After the gauge bar 63 has been removed from the tools, and the latter have been moved sufficiently far in overlapping or cross direction, the right hand tool slide is moved in accordance with the scale 62 to the left to a multiple of the thread pitch of the scale 62 until the end of the tool likewise projects far enough beyond the cone apex in the opposite direction of the other tool.

The next step in the operation is to set the tools to the diameter of the thread to be milled in the usual manner by moving forward the milling cutter 54 transversely of the machine directly up to the work piece by the shaft or spindle 55 until the point of the milling cutter 54 touches the wall of the work piece, adjustment being made according to the teeth of the thread desired in the usual manner by means of the gauge or scale wheel 60. The machine may now be started for operation. The backward and forward motion of the tool head stocks required for setting and removing the tools is limited in the direction of the work piece by accurately adjusting the stops 49 so that no further adjustment is required when changing the work pieces, once adjustment has been made.

It is obvious that various changes and modifications may be made in the details of construction and design of the above specifically described embodiment of this invention without departing from the spirit thereof, such changes and modifications being restricted only by the scope of the following claims.

What is claimed is:—

1. In a screw thread milling machine, a frame, a pair of carriages mounted for adjustment toward or from each other longitudinally of the frame, slides mounted on the carriages, milling cutters carried by the slides, means for automatically and simultaneously actuating the slides for moving the milling cutters transversely of the machine between the carriages, a head stock mounted on the machine between the carriages adapted to rotatably carry the work, means for adjusting the head stock at an angle corresponding to the surfaces to be threaded, and means for moving the head stock lengthwise of the frame, during the threading operation corresponding to the pitch of the thread to be cut.

2. A screw thread milling machine comprising a pair of milling cutters arranged parallel and oppositely one another, means for longitudinally adjusting said cutters toward or from each other, a head stock for holding the work in operative position adjacent the cutters and adapted to rotate the work and simultaneously impart thereto a longitudinal movement with respect to the cutters during the threading operation corresponding to the pitch of the thread to be cut, means for adjusting the head stock at an angle corresponding to the taper of the surfaces to be cut, means for rotating said head stock and moving the same longitudinally of the frame, and means interconnected with the head stock to respectively feed the cutters toward and away from the work in predetermined timed relation with the movements thereof.

3. A screw thread milling machine for simultaneously milling screw threads in internal oppositely coned surfaces of a body comprising a pair of milling cutters arranged parallel and oppositely one another, independently operable means for longitudinally adjusting said cutters toward or from each other, a head stock for holding the body in operative position adjacent the cutters and adapted to rotate the work and simultaneously impart thereto a longitudinal movement with respect to the cutters, means for adjusting the head stock at an angle corresponding to the pitch of the surfaces to be cut, and means interconnected with the head stock to respectively feed the cutters toward and away from the internally coned surfaces of the body in predetermined timed relation with the movements thereof.

4. A screw thread milling machine comprising a frame, a pair of carriages mounted for adjustment toward or from each other longitudinally of the frame, transversely movable slides mounted on the carriages, milling cutters carried by the slides, a head stock mounted on the machine between the carriages, a chuck rotatably carried by the head stock for gripping the work, means for adjusting the head stock at an angle corresponding to the surfaces to be threaded, a feed screw for moving the head stock lengthwise of the frame, means including a clutch for throwing said feed screw into and out of operation, and means interconnected with said feed screw and said rotatable chuck to simultaneously move the slides and feed said cutters toward and away from the work in predetermined timed relation with the movements thereof.

5. A screw thread milling machine comprising a pair of thread milling cutters arranged parallel and oppositely one another, means for effecting independent longitudinal adjustment of said cutters toward and from each other, gauging means to set the cutters in adjusted position so that the cutters overlap the surfaces of the work traversed by each other so that the threads cut by both cutters accurately coincide to form a continuous thread through the work, means for holding the work in operative position adjacent the cutters and adapted to rotate the work and simultaneously impart thereto a longitudinal movement with respect to the cutters, and means interconnected with the work holding means operative to respectively feed the cutters toward and away from the work, in predetermined timed relation with the movements thereof.

In testimony whereof we hereunto affix our signatures.

PAUL KIEFERT.
PAUL PETER.